(12) United States Patent
Robertson et al.

(10) Patent No.: US 7,962,661 B2
(45) Date of Patent: Jun. 14, 2011

(54) SYSTEM AND METHOD FOR DETERMINING A BUS ADDRESS FOR A CONTROLLER WITHIN A NETWORK

(75) Inventors: David C. Robertson, Royal Oak, MI (US); Jong Min Park, Sterling Heights, MI (US)

(73) Assignee: LG Chem, Ltd. (KR)

( * ) Notice: Subject to any disclaimer, the term of this patent is extended or adjusted under 35 U.S.C. 154(b) by 339 days.

(21) Appl. No.: 12/164,812

(22) Filed: Jun. 30, 2008

(65) Prior Publication Data

US 2009/0327540 A1    Dec. 31, 2009

(51) Int. Cl.
*G06F 3/00* (2006.01)
(52) U.S. Cl. ............................................ 710/9; 710/110
(58) Field of Classification Search ............... 710/8–10, 710/15–17, 62, 64, 300–302, 104, 105, 110
See application file for complete search history.

(56) References Cited

U.S. PATENT DOCUMENTS

| | | | | |
|---|---|---|---|---|
| 4,775,931 A * | 10/1988 | Dickie et al. | | 710/9 |
| 4,951,385 A | 8/1990 | DeSanto | | |
| 5,237,257 A * | 8/1993 | Johnson et al. | | 320/106 |
| 5,420,987 A * | 5/1995 | Reid et al. | | 710/10 |
| 5,491,830 A * | 2/1996 | Ferri | | 710/9 |
| 5,530,895 A * | 6/1996 | Enstrom | | 710/9 |
| 5,666,557 A * | 9/1997 | Cassidy et al. | | 710/8 |
| 5,698,140 A * | 12/1997 | Lamb et al. | | 252/502 |
| 5,727,169 A * | 3/1998 | Calzi | | 710/104 |
| 5,727,184 A * | 3/1998 | Richter et al. | | 710/62 |
| 6,094,053 A * | 7/2000 | Harvey | | 324/434 |
| 6,339,831 B1 * | 1/2002 | Sugawara et al. | | 714/3 |
| 6,434,632 B1 * | 8/2002 | Hall | | 710/14 |
| 6,442,640 B1 * | 8/2002 | Eby et al. | | 710/305 |
| 6,564,278 B1 * | 5/2003 | Olson | | 710/301 |
| 6,615,285 B1 * | 9/2003 | Schafranek et al. | | 710/3 |
| 7,245,501 B2 * | 7/2007 | Kotson et al. | | 361/760 |

* cited by examiner

*Primary Examiner* — Khanh Dang
(74) *Attorney, Agent, or Firm* — Cantor Colburn LLP

(57) ABSTRACT

A system and a method for determining a bus address for a controller within a network are provided. The method includes coupling a first set of pins of a wire harness connector to a second set of pins of a PCB connector of the controller. The method further includes sampling voltages of a portion of the first set of pins of the PCB connector to determine a wire harness ID utilizing a microprocessor. The method further includes accessing a look-up table from a memory device to select the bus address for the controller using the wire harness ID utilizing the microprocessor. The look-up table includes a plurality of bus addresses correspondingly associated with a plurality of wire harness IDs. The method further includes storing the selected bus address in the memory device utilizing the microprocessor.

6 Claims, 3 Drawing Sheets though illustrated and described herein with reference to specific embodiments, the present invention is not intended to be limited to the details shown. Rather, various modifications may be made in the details within the scope and range of equivalents of the claims and without departing from the invention.

SYSTEM AND METHOD FOR DETERMINING A BUS ADDRESS FOR A CONTROLLER WITHIN A NETWORK

TECHNICAL FIELD

This application relates generally to a system and a method for determining a bus address for a controller within a network.

BACKGROUND OF THE INVENTION

In networks with distributed slave controllers, it is important for a master controller to know the bus address of each of the slave controllers within the network in order to communicate with the slave controllers. This is usually solved by individually programming each slave controller with a unique bus address that can be a time intensive task. Further, if the slave controller is programmed to an incorrect bus address, the slave controller will not be able to communicate with the master controller.

Accordingly, the inventors herein have recognized a need for an improved system and method for determining a bus address for a controller that minimizes and/or eliminates the above-mentioned deficiency.

SUMMARY OF THE INVENTION

A method for determining a bus address for a controller within a network in accordance with one exemplary embodiment is provided. The method includes coupling a first set of pins of a wire harness connector to a second set of pins of a controller connector of the controller. The method further includes sampling voltages of a portion of the first set of pins of the PCB connector to determine a wire harness ID utilizing a microprocessor. The method even further includes accessing a look-up table from a memory device to select the bus address for the controller using the wire harness ID utilizing the microprocessor. The look-up table includes a plurality of bus addresses correspondingly associated with a plurality of wire harness IDS. The look-up table is operably coupled to the microprocessor. The method further includes storing the bus address selected for the controller in the memory device utilizing the microprocessor.

A system for determining a bus address within a network in accordance with one exemplary embodiment is also provided. The system includes a controller having a printed circuit board (PCB), a microprocessor, a memory device, and a PCB connector. The microprocessor is coupled to the PCB. The memory device is operably coupled to the microprocessor. The memory device has a look-up table with a plurality of bus addresses associated with a plurality of wire harness IDs. The PCB connector has a first set of pins. The PCB connector is coupled to the PCB. The system further includes a wire harness connector having a second set of pins being coupled to the first set of pins. The microprocessor is configured to sample voltages of a portion of the first set of pins of the PCB connector to determine a wire harness ID and further configured to access the look-up table to select the bus address for the controller using the wire harness ID.

These and other features and advantages of this invention will become more apparent to those skilled in the art from the detailed description of a preferred embodiment. The drawings that accompany the detailed description are described below.

DETAILED DESCRIPTION OF AN EXEMPLARY EMBODIMENT

Exemplary embodiments of a wire harness identifier system for determining a bus address for a controller within a network will now be described with reference to the drawings. The exemplary wire harness identifier system described herein is configured to sample voltages of a portion of a first set of pins in a PCB connector coupled to a portion of a second set of pins in a wire harness connector to determine a wire harness ID utilizing a microprocessor. The exemplary wire harness identifier system described herein is further configured to access a look-up table to select the bus address for the controller using the wire harness ID utilizing the microprocessor. The look-up table includes a plurality of bus address correspondingly associated with a plurality of wire harness IDs. The exemplary wire harness identifier system described herein is further configured to store the bus address selected for the controller in a memory device utilizing the microprocessor. This enables a master controller within the network to identify the identity of the controller through the selected bus address among other controllers within the system without having to uniquely configure the controller directly.

Figure 1:
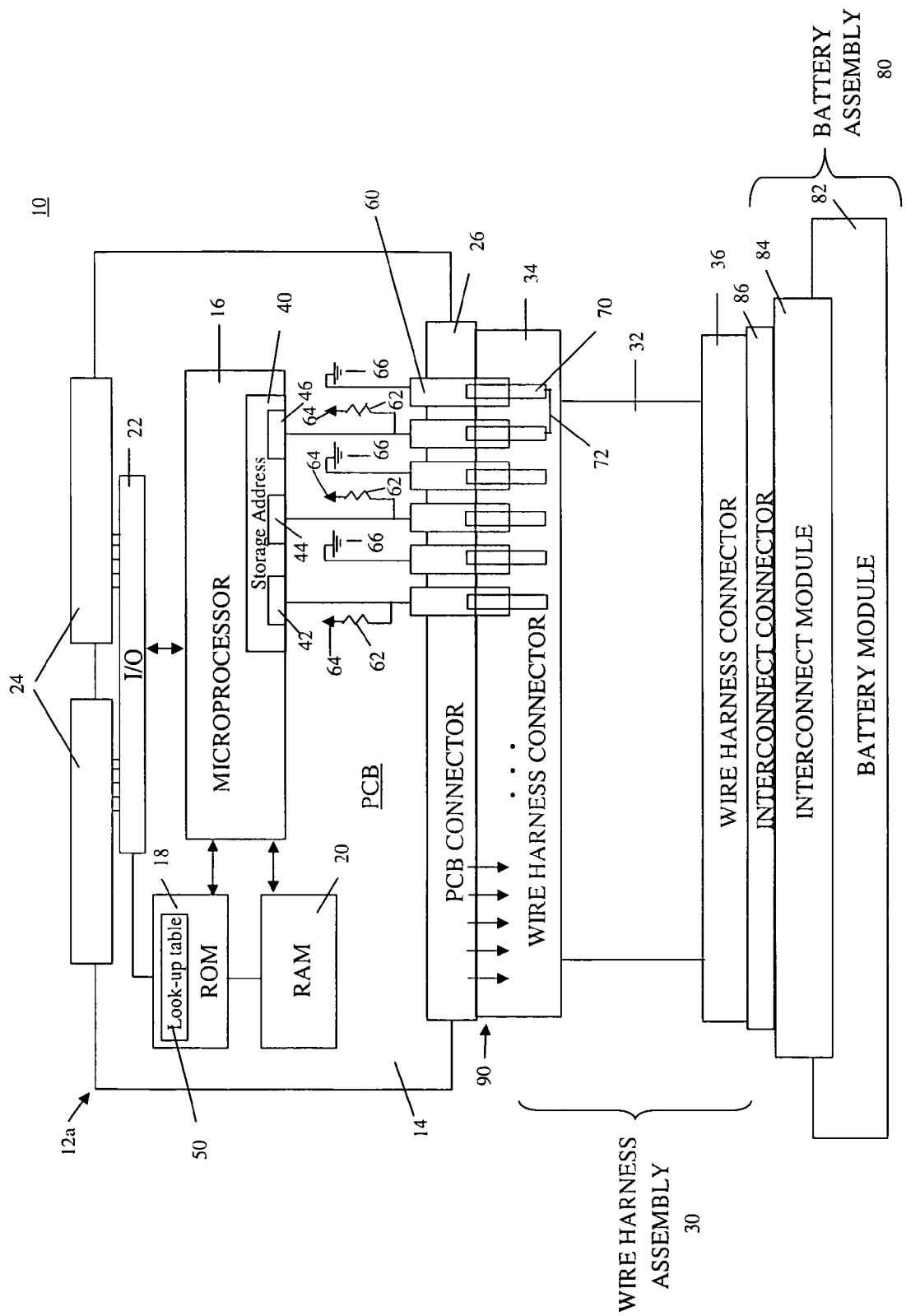
FIG. 1 is a schematic of a controller coupled to a wire harness connector in accordance with an exemplary embodiment.

Referring now to the drawings, FIG. 1 is a schematic of a wire harness identifier system 10 used to determine a bus address for a controller within a network in accordance with one exemplary embodiment of the present invention. The system 10 comprises a controller 12a having a printed circuit board (PCB) 14 with a microprocessor 16, a read-only memory (ROM) 18, a volatile memory such as a random access memory (RAM) 20, an input/output (I/O) interface 22, headers 24, and a PCB connector 26 coupled thereto. The headers 24 coupled to the PCB 14 are used to enable the PCB 14 to be identified within the network. The system 10 further comprises a wire harness assembly 30 having a wire harness body 32 with a first wire harness connector 34 located at one end and a second wire harness connector 36 located at the opposite end. The wire harness assembly 30 is configured to operably couple to the PCB 14 by electrically coupling the first wire harness connector 34 of the wire harness assembly 30 to the PCB connector 26 of the PCB 14.

The microprocessor 16 is provided to determine a wire harness ID uniquely set by the first wire harness connector 34 of the wire harness assembly 30. The microprocessor 16 is further provided to select a bus address using the wire harness ID for the controller 12a, thereby enabling the controller 12a to be identified within the network. The microprocessor operably communicates with the ROM 18, RAM 20 and I/O interface 22. The computer readable media including ROM 18 and RAM 20 may be implemented using any of a number of known memory devices such as PROMs, EPROMs, EEPROMs, flash memory or any other electric, magnetic, optical or combination memory device cable of storing data, some of which represent executable instructions used by the microprocessor 16.

The microprocessor 16 includes a storage address 40 with storage bits 42, 44, 46 for correspondingly storing bits of information therein. The storage address 40 may include more than three storage bits depending on the desired configuration (i.e., number of controllers within the network). However, for ease of discussion, only three storage bits are shown and discussed in detail. The bits of information stored in the storage bits 42, 44, 46 together represent the wire harness ID. For example, storage bit 42 holds the first bit of the wire harness ID, storage bit 44 holds the second bit of the wire harness ID, and storage bit 46 holds the third bit of the wire harness ID. The storage address 40 can represent one of any eight different wire harness IDs, which in this example is 110.

The microprocessor 16 can be any conventional microprocessor configured for carrying out the methods and/or functions described herein. The microprocessor 16 comprises a combination of hardware and/or software/firmware with a computer program that, when loaded and executed, permits the microprocessor 16 to operate such that it carries out the methods described herein. Computer program means or computer program used in the present context of exemplary embodiments of the present invention include any expression, in any language, code, notation, or the like of a set of instructions intended to cause a system having information processing capabilities to perform a particular function either directly or after conversion to another language, code, notation, or the like reproduction in a different material form.

In accordance with one embodiment, ROM 18 is provided to store a predefined look-up table 50 used to select the bus address for the controller 12*a* using the wire harness ID. The look-up table 50 includes a plurality of bus addresses correspondingly associated with a plurality of wire harness IDs. The microprocessor 16 operably communicates with ROM 18 to access the look-up table 50 in order to select the bus address for the controller 12*a* using the wire harness ID. In an exemplary operation, the microprocessor 16 selects bus address 10000 when the wire harness ID is 100, selects bus address 10001 when the wire harness ID is 101, and so on. The number of bus addresses and corresponding wire harness IDs can vary depending on the application. It should be noted that in other alternate embodiments, the predefined look-up table 50 is stored in RAM 20 and is accessed by the microprocessor 16 as described above. Once the bus address is selected for the controller 12*a*, the selected bus address is stored in RAM 20 and/or ROM.

The PCB connector 26 is provided to enable the microprocessor 16 to determine the wire harness ID set by the first wire harness connector 34. The PCB connector 26 includes a first set of pins 60 with pins directly coupled to the microprocessor 16, a resistor 62 and a power source 64 (e.g., 5V source) and additional pins electrically coupled to ground 66 as shown. The microprocessor 16 samples or measures the voltages of the pins coupled to the microprocessor 16 and the power source 64 to determine the wire harness ID. The pins coupled to the microprocessor 16 are configured to have a high logic voltage or a low logic voltage. The voltages of the pins of the first set of pins 60 coupled to the microprocessor indicate corresponding bits of the wire harness ID. In this example, at least one pin of the first set of pins 60 has a high logic voltage and at least one pin of the first set of pins has a low logic voltage. As such, at least one of the storage bits 42, 44, 46 holds a high logical bit-value (logical bit 1) and at least one of the storage bits 42, 44, 46 holds a low logical bit-value (logical bit 0). The states of the storage bits 42, 44, 46 together represent the wire harness ID. Of course, the voltages at the pins of the first set of pins 60 coupled to the microprocessor will depend on the wire harness ID.

The first wire harness connector 34 is provided to set a portion of the first set of pins 60 of the PCB connector 26 to a low logic voltage or a high logic voltage based on the wire harness ID. More specifically, the wire harness connector 34 includes a second set of pins 70 configured to set the wire harness ID through the first set of pins 60, which are sampled by the microprocessor 16. In this example, at least two pin connectors of the second set of pins 70 are coupled by a jumper 72, thereby coupling at least one pin of the first set of pins 60 coupled to the microprocessor 16 to at least one pin of the first set of pins 60 electrically coupled to ground 66, which sets this pin coupled to the microprocessor 16 to have a low logic voltage. In this example, the other pins of the first set of pins 60 coupled to the microprocessor 16 are not coupled to pins electrically coupled to ground, which sets those pins to a high logic voltage.

In operation, the first wire harness connector 34 is coupled to the PCB connector 26 of the controller 12*a*. The second set of pins 70 of the first wire harness connector 34 sets pins of the first set of pins 60 to have either a low logic voltage or a high logic voltage correspondingly indicating a particular bit of the wire harness ID. Next, the microprocessor 16 samples the voltages of a portion of the first set of pins 60 to determine the wire harness ID. The sampled voltages are correspondingly stored in the storage address 40 as bits. The microprocessor 16 then accesses the look-up table 50 in ROM 18 or RAM 20 to select the bus address for the controller 12*a* using the wire harness ID. The microprocessor then stores the selected bus address for the controller 12*a* in ROM 18 or RAM 20, thereby enabling the controller 12*a* to be identified within the network.

The second wire harness connector 36 of the wire harness assembly 30 is provided to operably couple a battery assembly 80 to the PCB 14. The battery assembly 80 comprises a battery module 82, an interconnect module 84, and an interconnect connector 86. The battery module 82 includes battery cells for providing DC current. The interconnect module 84 is coupled to the battery module 82 and is configured to electrically couple the battery cells of the battery module 82 together in a desired configuration. The interconnect connector 86 is operably coupled to the second wire harness connector 36, which effectively couples the PCB 14 to the battery module 82 and enables the microprocessor 16 to measure signals from additional connectors 90 on the PCB connector 26 to obtain information relating to the battery module 82. Information that may be obtained from the battery module 82 may include a temperature of the battery module 82, a state of health of the battery cells within the battery module 82, etc.

Figure 2:
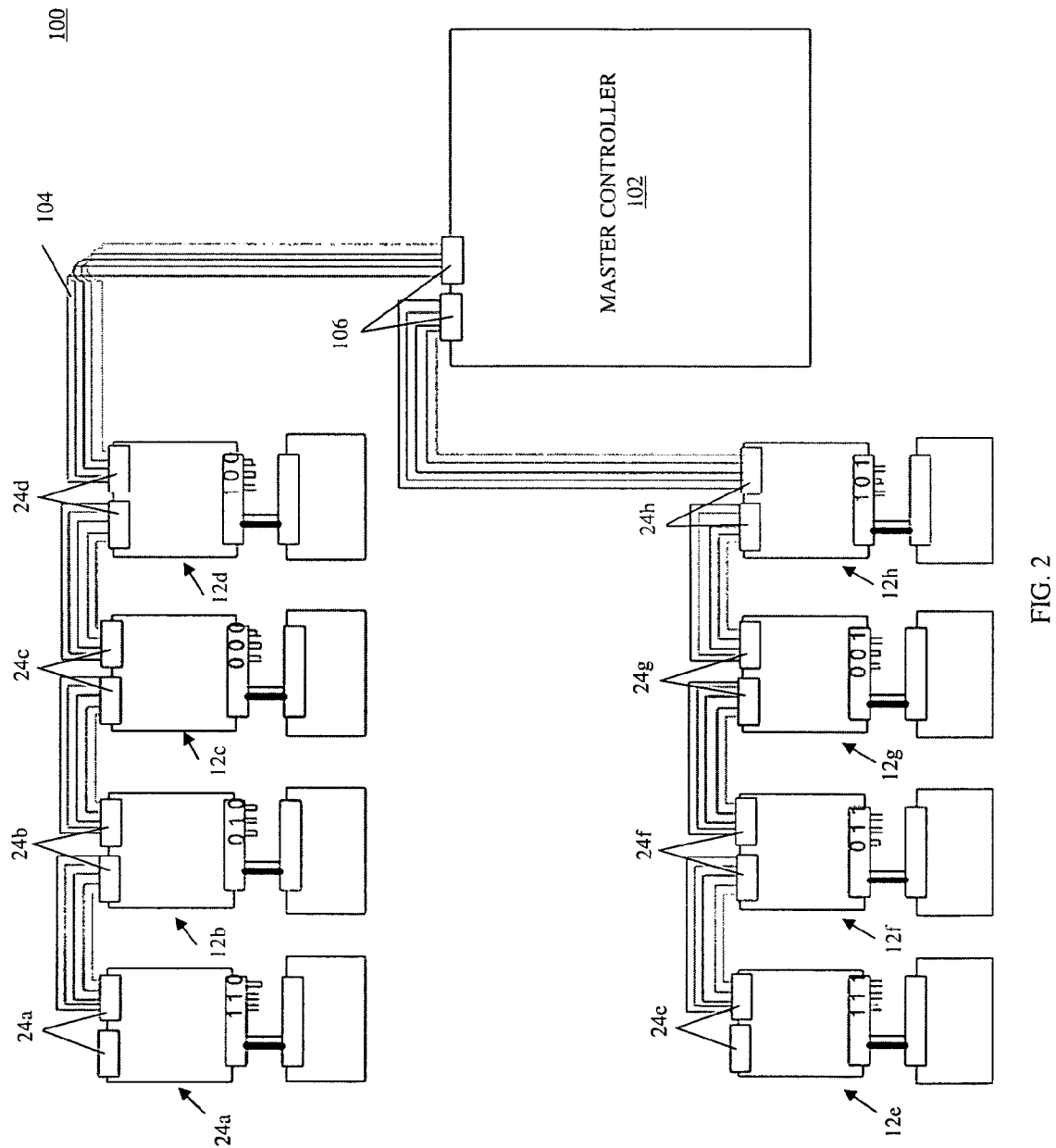
FIG. 2 is schematic of a network with distributed controllers and a master controller in accordance with another exemplary embodiment.

Referring now to FIG. 2, controller 12*a* can be incorporated within a network 100 having other controllers 12*b*-12*h* with different bus addresses selected for each using the method described above for controller 12*a*. The network 100 includes a master controller 102 coupled to controller 12*a* and the other controllers 12*b*-12*h* within the network 100 through a communication bus 104. The other controllers 12*b*-12*h* within the network 100 include headers 24*b*-24*h* similar to header 24*a* of controller 12*a* for enabling communication with the master controller 102 within the network. In particular, the communication bus 104 operably couples the headers 24*a*-24*h* of the controllers 12*a*-12*h* to headers 106 of the master controller 102.

The master controller 102 is provided to obtain information relating to each battery module correspondingly of each of the controllers 12*a*-12*h* within the network 100. The master controller 102 is configured to send a request to a particular bus address and obtain battery module information from the controller having that particular bus address. For example, when the master controller 102 sends a request to bus address 10100, which for example is selected for controller 12*a* using the wire harness ID 110, PCB 14 of controller 12*a* reports information relating to battery module 82 associated with controller 12*a* back to the master controller 102.

As described above, the wire harness connector of each of the controllers is utilized to determine a unique bus address of the controller within the network. Accordingly the master controller 102 can identify each of the controllers within the network and receive information regarding their associated battery module.

Figure 3:
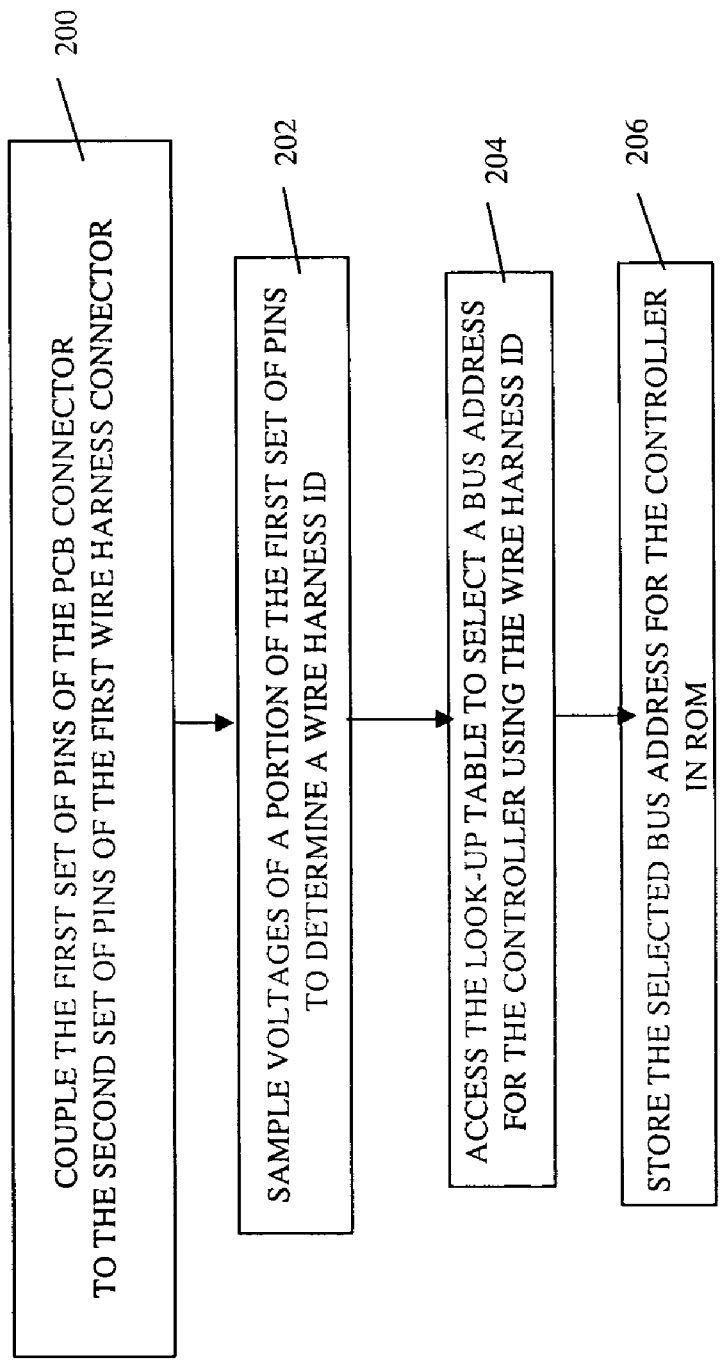
FIG. 3 is a flow diagram of a method for determining a bus address for a controller within a network in accordance with another exemplary embodiment.

Referring to FIG. 3, a method for determining a bus address for controller 12*a* within the network 100 is illustrated. The method can be implemented utilizing software algorithms executed by the microprocessor 16 of the controller 12*a*.

At step 200, a user couples the first set of pins 60 of the PCB connector 26 to the second set of pins 70 of the first wire harness connector 34.

At step 202, the microprocessor 16 samples voltages of a portion of the first set of pins 60 of the PCB connector 28 to determine a wire harness ID. The wire harness ID is stored in the in the storage address of the microprocessor 16.

At step 204, the microprocessor 16 accesses the look-up table from ROM 18 or RAM 20 to select a bus address for the controller 12*a* using the wire harness ID. The look-up table includes a plurality of bus addresses correspondingly associated with a plurality of wire harness IDs.

At step 206, the microprocessor 16 stores the bus address selected for the controller 12*a* in ROM 18 and/or RAM 20.

Steps 200-206 can be implemented for each controller within the network so that each controller can be identified by the master controller.

The system and the method for determining a bus address for a controller within a network provide a substantial advantage over other systems and methods. In particular, the system and the method provide a technical effect of determining a bus address for a controller based on a wire harness ID, without having to manually program the controller to a specific bus address or manually setting switches on the controller.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A method for determining a bus address for a first controller within a network, comprising:
    coupling a first set of pins of a PCB connector of the first controller to a second set of pins of a wire harness connector;
    sampling voltages of a portion of the first set of pins of the PCB connector to determine a wire harness ID utilizing a microprocessor;
    accessing a look-up table from a read-only memory device to select the bus address for the first controller using the wire harness ID utilizing the microprocessor, the look-up table includes a plurality of bus addresses correspondingly associated with a plurality of wire harness IDs;
    storing the bus address selected for the first controller in a random-access memory device utilizing the microprocessor;
    sending a request to the bus address of the first controller utilizing a master controller; and;
    reporting information relating to a battery module from the first controller to the master controller in response to the request.

2. The method as in claim 1, wherein the portion of the first set of pins comprises at least a first pin and a second pin, the first pin having a high logic voltage indicating a first bit of the wire harness ID and the second pin having a low logic voltage indicating a second bit of the wire harness ID.

3. The method as in claim 2, wherein the second set of pins comprises at least a first connector pin and a second connector pin, the at least first connector pin and the second connector pin being electrically coupled together by a jumper to set the second pin of the first set of pins to the low logic voltage.

4. A system for determining a bus address within a network, comprising:
    a first controller having a printed circuit board (PCB), a microprocessor, a read-only memory device, a random-access memory device, and a PCB connector, the microprocessor coupled to the PCB, both the read-only memory device and the random-access memory device being operably coupled to the microprocessor, the read-only memory device having a look-up table with a plurality of bus addresses associated with a plurality of wire harness IDs, the PCB connector having a first set of pins, the PCB connector being coupled to the PCB; and
    a wire harness connector having a second set of pins being coupled to the first set of pins, the microprocessor being configured to sample voltages of a portion of the first set of pins of the PCB connector to determine a wire harness ID and further configured to access the look-up table in the read-only memory device to select the bus address for the controller using the wire harness ID, the microprocessor further configured to store the bus address selected for the first controller in the random-access memory device; and
    a master controller being configured to send a request to the bus address of the first controller, and the first controller being configured to report information relating to a battery module to the master controller in response to the request.

5. The system as in claim 4, wherein the portion of the first set of pins comprises at least a first pin and a second pin, the first pin having a high logic voltage indicating a first bit of the wire harness ID and the second pin having a low logic voltage indicating a second bit of the wire harness ID.

6. The system as in claim 5, wherein the second set of pins comprises at least a first connector pin and a second connector pin, the first connector pin and the second connector pin being electrically coupled together by a jumper to set the second pin of the first set of pins to the low logic voltage indicating the second bit of the wire harness ID.

* * * * *